May 26, 1964 F. W. ROBERTS ETAL 3,134,599

DICTATION APPARATUS

Filed Sept. 25, 1959 8 Sheets-Sheet 1

INVENTORS
FREDERICK W. ROBERTS
JOHN R. MONTGOMERY
FREDERICK W. SCHUELER
FREDERICK A. PIERINI
BY
Curtis Morris & Safford ATTYS INVENTORS
FREDERICK W. ROBERTS
JOHN R. MONTGOMERY
FREDERICK W. SCHUELER
FREDERICK A. PIERINI
BY
Curtis Morris Safford ATT'YS INVENTORS
FREDERICK W. ROBERTS
JOHN R. MONTGOMERY
FREDERICK W. SCHUELER
FREDERICK A. PIERINI
BY
Curtis Morris & Safford
ATTORNEYS INVENTORS
FREDERICK W. ROBERTS
JOHN R. MONTGOMERY
FREDERICK W. SCHUELER
FREDERICK A. PIERINI
BY
Curtis, Morris & Safford
ATTORNEYS

DICTATION APPARATUS

Filed Sept. 25, 1959

INVENTORS
FREDERICK W. ROBERTS
JOHN R. MONTGOMERY
FREDERICK W. SCHUELER
FREDERICK A. PIERINI
BY
Curtis, Morris & Safford
ATTORNEYS May 26, 1964 F. W. ROBERTS ETAL 3,134,599

DICTATION APPARATUS

Filed Sept. 25, 1959 8 Sheets-Sheet 6

INVENTORS
FREDERICK W. ROBERTS
JOHN R. MONTGOMERY
FREDERICK W. SCHUELER
FREDERICK A. PIERINI
BY
Curtis, Morris & Safford
ATTORNEYS

DICTATION APPARATUS

Filed Sept. 25, 1959 8 Sheets-Sheet 8

INVENTORS
FREDERICK W. ROBERTS
JOHN R. MONTGOMERY
FREDERICK W. SCHUELER
FREDERICK A. PIERINI
BY
Curtis Morris & Safford
ATTORNEYS

United States Patent Office 3,134,599
Patented May 26, 1964

3,134,599
DICTATION APPARATUS

Frederick W. Roberts, Fairfield, John R. Montgomery, Bridgeport, Frederick W. Schueler, Monroe, and Frederick A. Pierini, Bridgeport, Conn., assignors to Dictaphone Corporation, Bridgeport, Conn., a corporation of New York Filed Sept. 25, 1959, Ser. No. 842,234
44 Claims. (Cl. 274—21)

This invention relates to dictation apparatus. More in particular, this invention relates to improved means for enabling a dictator to play back his recorded dictation.

In typical dictating machines currently in use, a recording and a reproducing head are mounted together on a "carriage" arranged to transport these heads across the surface of a rotatably-driven sound record. During dictation, the carriage is driven in "forward" direction and the recording head is engaged with the record to impress the spoken message thereon. When the dictator desires to listen to a part of his previous dictation, the carriage may be shifted in reverse direction until it reaches a selected point on the record. The carriage then is driven forward with the reproducing head engaged with the record to play back the desired part of the dictation.

Frequently, the dictator will want to reproduce only a small part of the record that is located a substantial distance back from the point at which recording is taking place. After playing back that part of the record, the carriage conventionally is shifted manually back to the position of its farthest advance, i.e. to its original position when the backspacing operation was initiated, and dictation then is resumed. Because time is required to shift the carriage back to its recording position, such an arrangement not only is inefficient but may even cause the dictator to lose his train of thought.

These and related problems have been solved in accordance with the present invention which provides a superior dictating machine which includes power means adapted to drive the reproducing head backward as well as forward under the control of a remote unit such as a hand microphone, and which is capable of effectively instantaneous switchover from playback to recording condition. In a specific embodiment of this invention to be described hereinbelow in detail, the recording and reproducing heads are mounted on separate carriages arranged for independent movement along the surface of the record. During dictation, the two carriages move in unison while the recording head impresses a message on the record. To reproduce a portion of the dictated material, a playback control is operated to drive the reproducing head carriage back to the desired part of the record which then is reproduced by driving the reproducing head carriage forward. During this playback operation, the recording head carriage remains in its forward position.

To resume dictation, the usual recording control is operated which immediately starts the recording head carriage moving forward with the machine conditioned for a recording operation. Thus there is no time lag in switching from a playback to a recording operation. At the time of the switchover to recording, the reproducing head carriage is brought rapidly back up to the position of the recording head carriage so that the two carriages may be driven together in forward direction.

Accordingly, it is an object of this invention to provide dictation apparatus that is superior to such apparatus provided heretofore. It is a further object of this invention to provide dictation apparatus having improved means for backspacing and for playing back part of the dictated material. It is a still further object of this invention to provide a dictating machine capable of substantially instantaneous switchover from playback to recording condition. Other objects, aspects and advantages of the invention will be in part pointed out in, and in part apparent from, the following description considered together with the accompanying drawings, in which:

Figure 1:
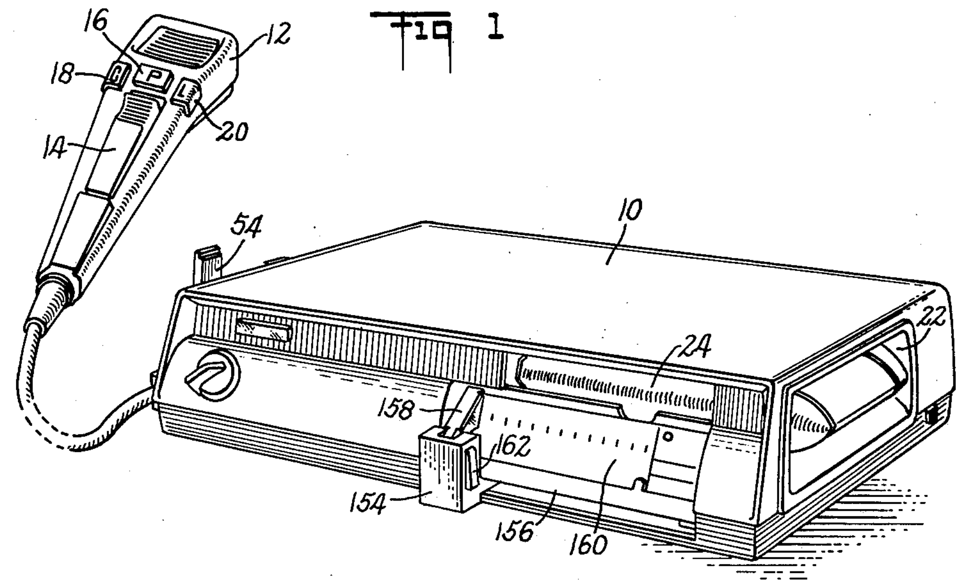
FIGURE 1 is a perspective view of a dictating machine constructed in accordance with the present invention.

Referring now to FIGURE 1, there is shown a dictating machine comprising the usual housing 10 and microphone 12. This microphone carries the operating controls for the dictating machine, including a "record" button 14, a "playback" button 16, a "correction" button 18, and a "length-of-letter" button 20.

Figure 2:
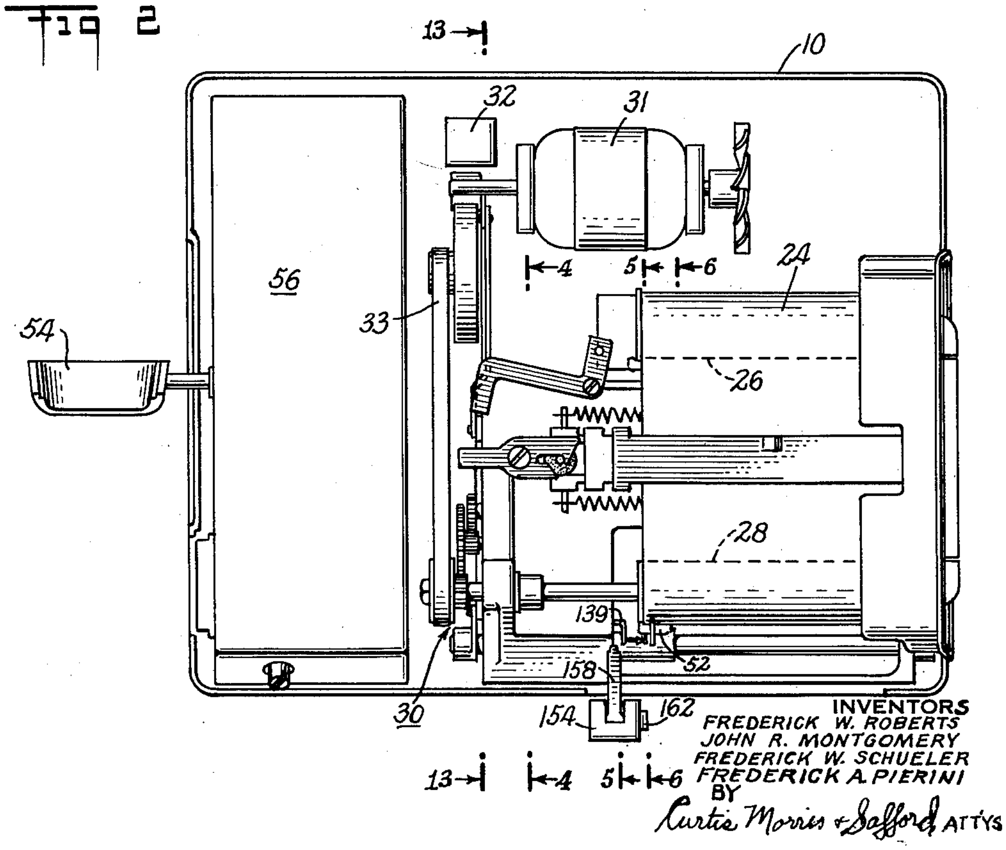
FIGURE 2 is a top plan view of the dictating machine, shown with the housing removed.

At the right-hand end of the housing 10 is an opening 22 through which a belt-type plastic sound record 24 (see also FIGURE 2) may be inserted and placed on a pair of rotatable mandrels 26, 28 in the manner described in U.S. Patent 3,056,606 issued to F. W. Schueler et al. One of these mandrels 28 is adapted to be driven by a motor 31 operating through a clutch 32 and drive-belt 33, as described in the above-mentioned application, in order to rotate record 24 for recording and playback operations. This motor also drives a gear mechanism generally indicated at 30, which transmits power to the various movable elements described below.

Figure 3:
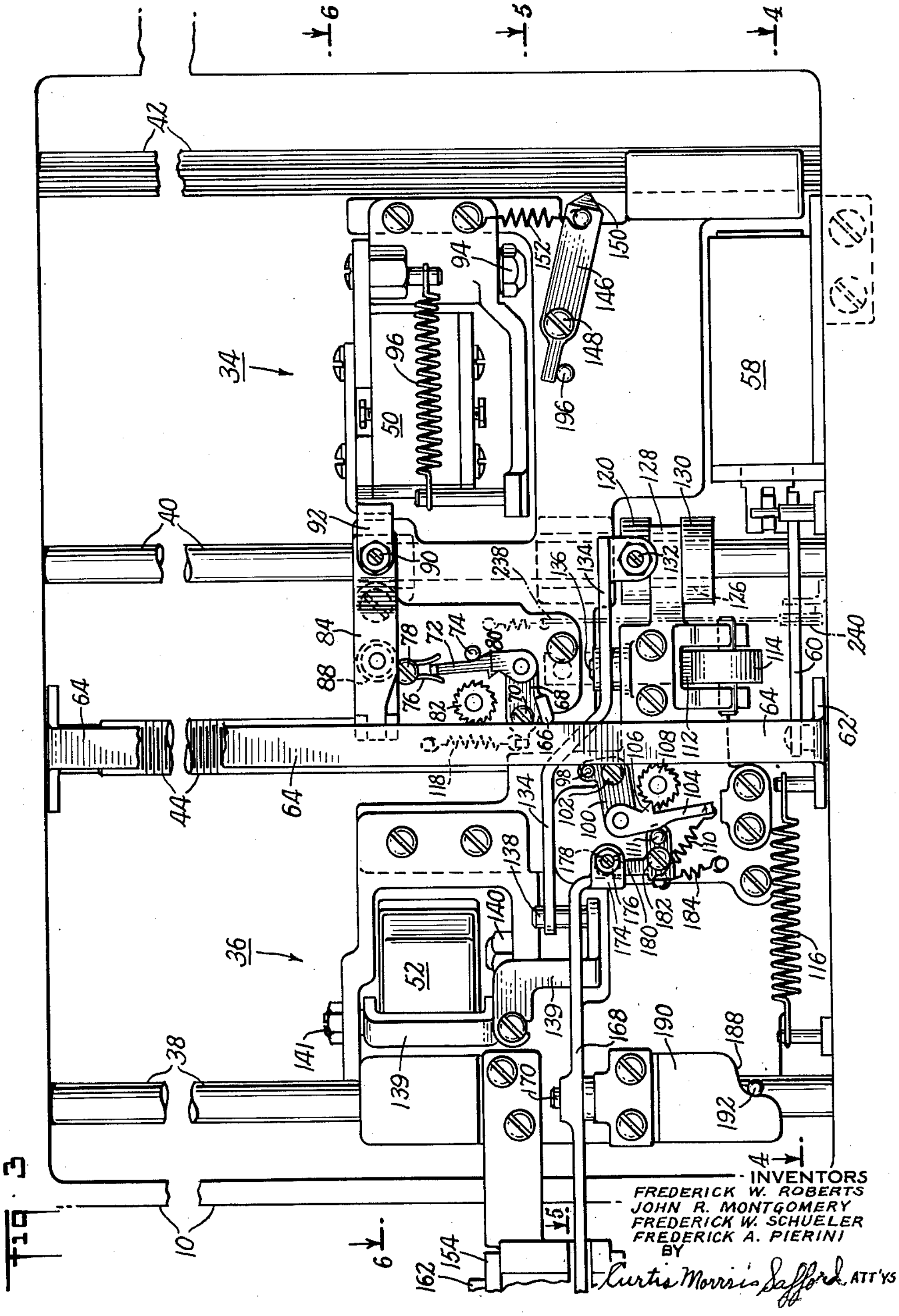
FIGURE 3 is an enlarged bottom plan view of the principal operating parts of the machine.
Figures 9, 10:
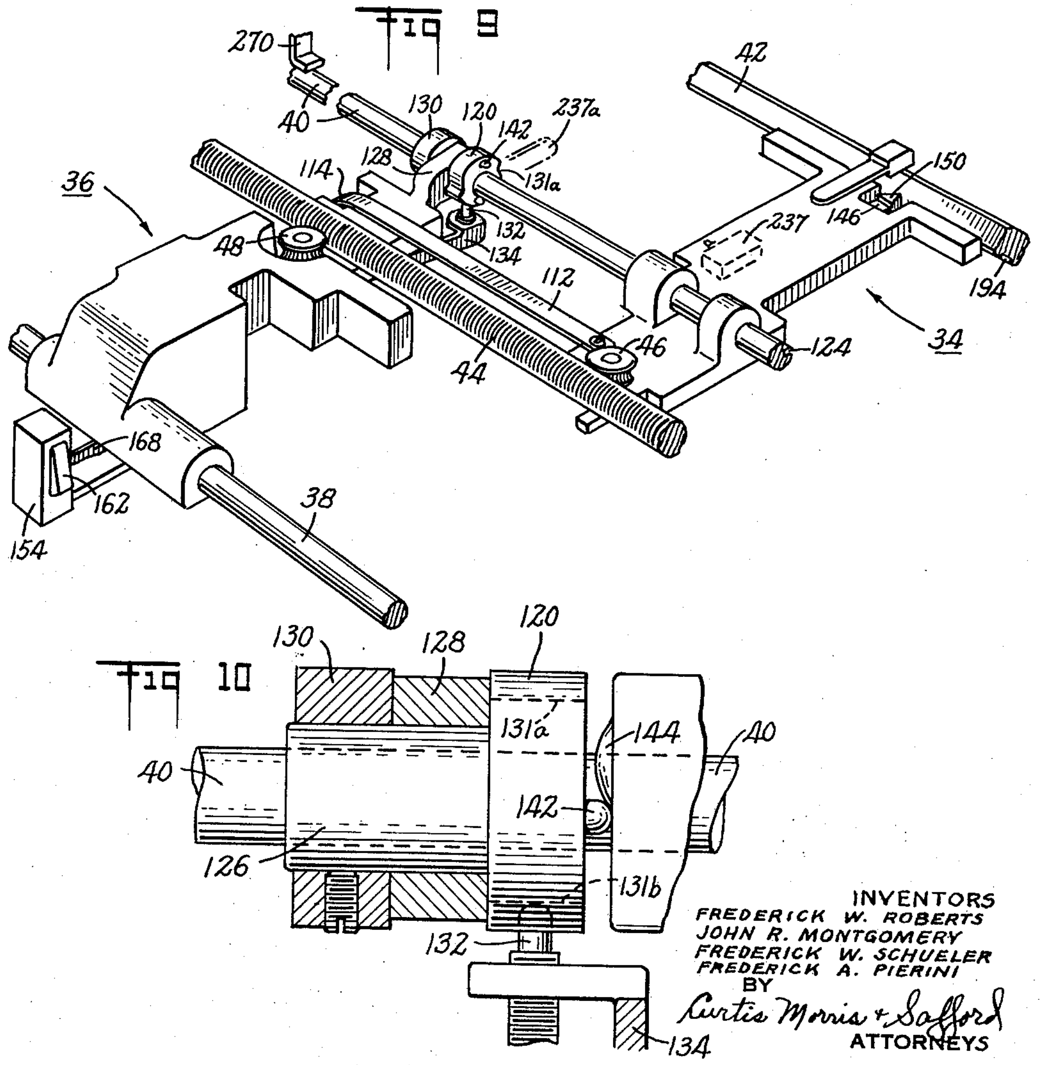
FIGURE 9 is a perspective view of the two carriages.
FIGURE 10 is an enlarged detail section taken along line 10—10 of FIGURE 5.

Referring now to FIGURES 3 and 9, the dictating machine is provided with a recording carriage 34 and a separate reproducing carriage 36. The reproducing carriage is slidably mounted on a front guide rod 38 and a center guide rod 40, while the recording carriage is slidably mounted on the center guide rod 40 and a back guide rod 42. Both carriages are adapted to be selectively driven by a common feedscrew 44, and for this purpose the carriages are provided with respective feednuts 46 and 48 of conventional construction. Pivotally supported on recording carriage 34 is a recording head 50 (see also FIGURE 6) arranged to move up and engage the underside of the sound record 24. The reproducing carriage similarly carries a pivotally-mounted reproducing head 52 normally positioned to engage record 24.

To initiate a recording operation, the microphone 12 is lifted from its cradle 54 (FIGURES 1 and 2) which operates the usual hook switch to supply current to the motor 31 and a transistor amplifier generally indicated at 56. Then by depressing the record button 14 on the microphone, a circuit (to be described hereinbelow) is closed to actuate the machine clutch 32 and start the feedscrew 44 rotating in forward direction. This circuit also energizes a record solenoid 58 shown in the lower right-hand corner of FIGURE 3.

Figure 4:
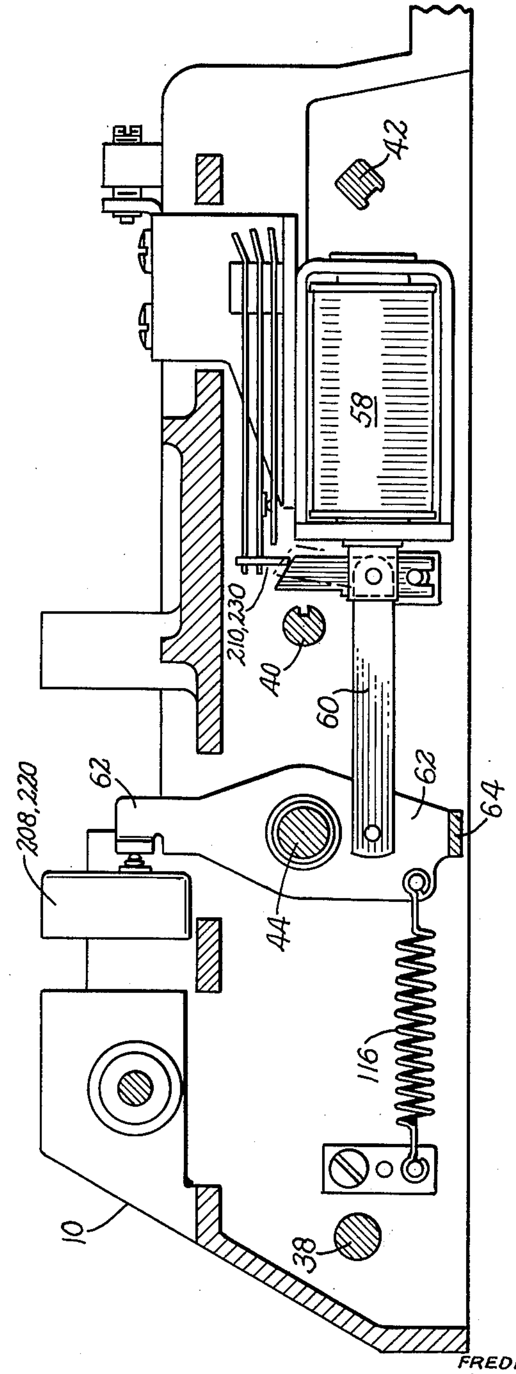
FIGURE 4 is an enlarged cross-section view taken along line 4—4 of FIGURE 2.

Referring now to FIGURE 4, when record solenoid 58 is energized its armature moves to the right and carries with it a horizontal bail lever 60 the left-hand end of which is pinned to a vertical bail arm 62. This bail arm is pivotally mounted about the axis of feedscrew 44 and forms part of an elongated bail 64 (FIGURE 3) which extends parallel to the feedscrew. When the record solenoid 58 is energized, the bail 64 is moved to the right to its recording position.

When the bail 64 moves to its recording position, it pushes a tab 66 to rotate a recording lock link 68 counterclockwise about its pivot 70. The right-hand end of this link 68 is pivotally pinned to a lock arm 72 which is shifted longitudinally by the rotation of the link. Arm 72 also is cammed by a pin 74 while it is moving longitudinally, with the result that this arm is shifted transversely (to the left) against the bias of a spring finger 76 secured to the frame at 78. This transverse movement of arm 72 causes a tooth 80 on the arm to engage a gear 82 which is mounted on the shaft of the recording feednut 46. This prevents the feednut from rotating and thereby causes the feednut to be drivably engaged with the feedscrew 44 in a well known manner. Consequently, the recording carriage 34 is driven forward by the rotation of the feedscrew.

Figure 6:
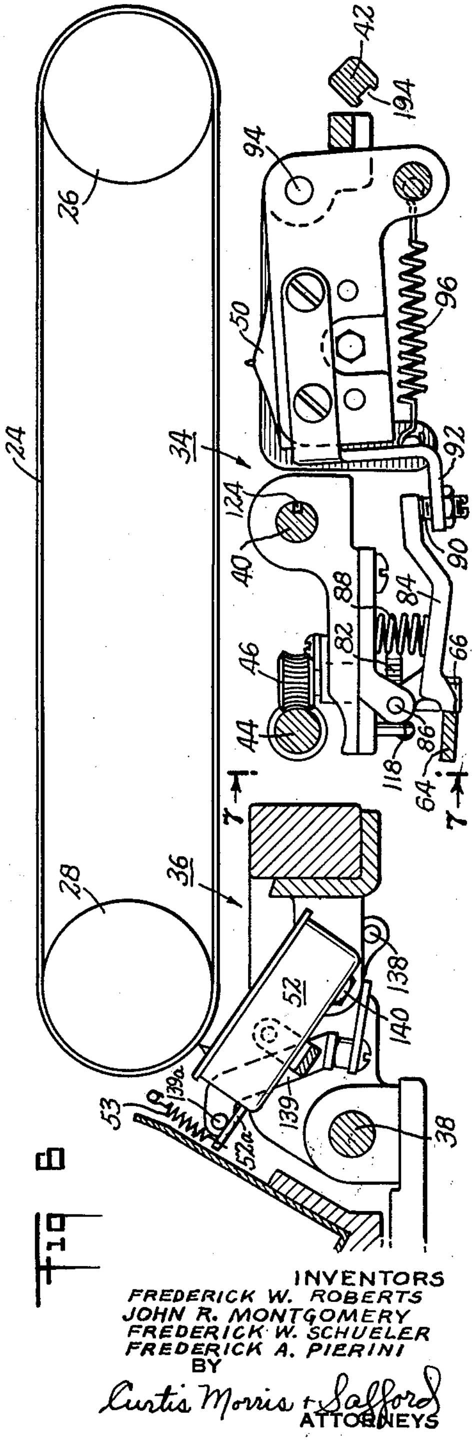
FIGURE 6 is an enlarged cross-section view taken along line 6—6 of FIGURE 2.

Referring now to FIGURE 6, it can be seen that the bail 64 also engages a retractor lever 84 which is pivoted at 86 and biased clockwise by a spring 88. Movement of the bail to its recording position, as described above, produces a corresponding counterclockwise rotation of lever 84 so that the right-hand end of this lever moves up to release a stop nut 90 on the end of a lift arm 92. This arm is secured to the recording head 50 which is pivoted at 94, and release of the stop nut 90 frees the lift arm and the recording head for pivotal movement up against the record 24 under the under the urging of a bias spring 96.

Returning again to FIGURE 3, pressed against the left-hand edge of bail 64 is a pin 98 extending down from a reproducing lock link 100. This link is pivoted at 102 and carries a lock arm 104 having a tooth 106 engaged with a gear 108 mounted on the shaft of the reproducing feednut 48. A bias spring 110 is fastened to lock arm 104 urging this arm towards the lock link 100. When the bail is moved to the right to its recording position, lock link 100 is free to rotatae clockwise, and lock arm 104 therefore is moved by bias spring 100 longitudinally, being guided in this movement by a cam pin 111. Thus, tooth 106 is disengaged from gear 108 to release the reproducing feednut 48 for rotation by the feedscrew 44. This effectively disengages the reproducing carriage 36 from the feedscrew.

To summarize, when the bail 64 is moved to the right to its recording position, the reproducing carriage 36 is disengaged from the feedscrew 44, the recording carriage is engaged with the feedscrew, and the recording head 50 moves into contact with the sound record 24. Consequently, when the feedscrew rotates, the recording carriage is driven forward and the recording head impresses on record 24 the massage dictated to the microphone 12.

Figure 7:
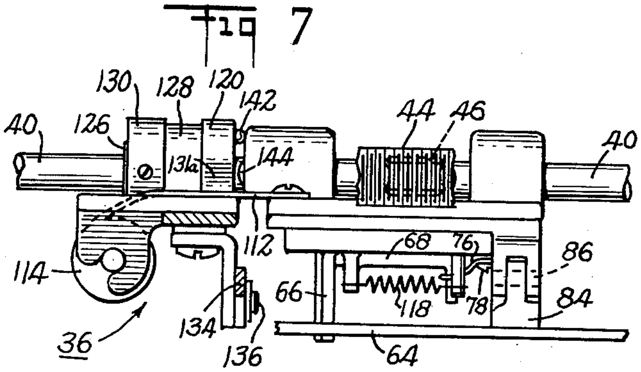
FIGURE 7 is a detail section taken along line 7—7 of FIGURE 6.

During this recording operation, the reproducing carriage 36 is pulled along behind the recording carriage 34 by a "negator" spring 112 (see also FIGURES 7 and 9) which connects the two carriages together and normally maintains the reproducing carriage closely abutting the recording carriage. This negator spring is of well-known construction, consisting of a thin flexible strip of metal having a slight transverse curvature and wound on a spool 114. Such a spring provides an effectively constant tension regardless of the extent to which it is stretched, and this tension is sufficiently light that the reproducing carriage can readily be moved or driven in reverse direction to a position remote from the recording carriage, as shown in FIGURE 9.

When the record button 14 is released, the machine clutch 32 is deenergized and the record 24 and feedscrew 44 thereupon stop, as do both carriages 34 and 36. However, the electrical control circuitry (to be described) is provided with means to maintain record solenoid 58 energized so that bail 64 is held in its recording position, i.e. to the right of that shown in FIGURE 3. Any subsequent operation of the record button 14 merely reenergizes the machine clutch to again start both carriages moving forward for further dictation.

To backspace the machine for the purpose of reproducing some or all of the previously dictated material, playback button 16 on the microphone 12 is pressed. This deenergizes the record solenoid 58 (as will be described) and the bail 64 is shifted back to its normal position by the bail spring 116 shown in FIGURE 4. This movement of the bail allows the recording lock link 68 (FIGURE 3) to be rotated clockwise by its bias spring 118, and thereby releases the lock arm 72 from the gear 82 due to the biasing action of spring finger 76. Consequently, the recording carriage 34 is effectively disengaged from the feedscrew 44.

At the same time, the retractor lever 84 (FIGURE 6) is released by bail 64, and this lever therefore moves clockwise under the action of spring 88 to pull the recording head 50 down away from the record 24. Also, the bail pushes pin 98 (FIGURE 3) to the left to rotate the reproducing lock link 100 counterclockwise and thereby engage the tooth 106 of lock arm 104 with the gear 108. Hence, the reproducing carriage 36 is engaged with the feedscrew 44.

Operation of the playback button 16 also energizes a backspace solenoid (as described hereinbelow) which controls the gear mechanism 30 in such a manner that the feedscrew 44 is started rotating in reverse direction at a speed four times greater than its normal forward speed, and at the same time the center guide rod 40 is caused to rotate exactly one-half revolution and then stop. (The arrangement for effecting this reversal of the feedscrew and producing the rotation of the center guide rod is described in U.S. Patent 2,961,243 issued to F. W. Schueler, and hence will not be repeated herein in detail. It may be noted, however, that in that copending application the feedscrew is identified with numeral 40, the backspace solenoid is identified with numeral 134, and "rear guide rod 98" of the copending application corresponds to the center guide rod 40 of the present application.

With the feedscrew 44 rotating in reverse and the reproducing feednut 48 engaged with the feedscrew, the reproducing carriage will be driven back along the surface of the record 24. This backspacing movement will continue until the center guide rod 40 has completed its rotation of one-half revolution, at which time the feedscrew and reproducing carriage stop. Additional incremental backspacing steps may be obtained by repeatedly pressing the playback button 16, as described in the above U.S. Patent 2,961,243.

Figure 5:
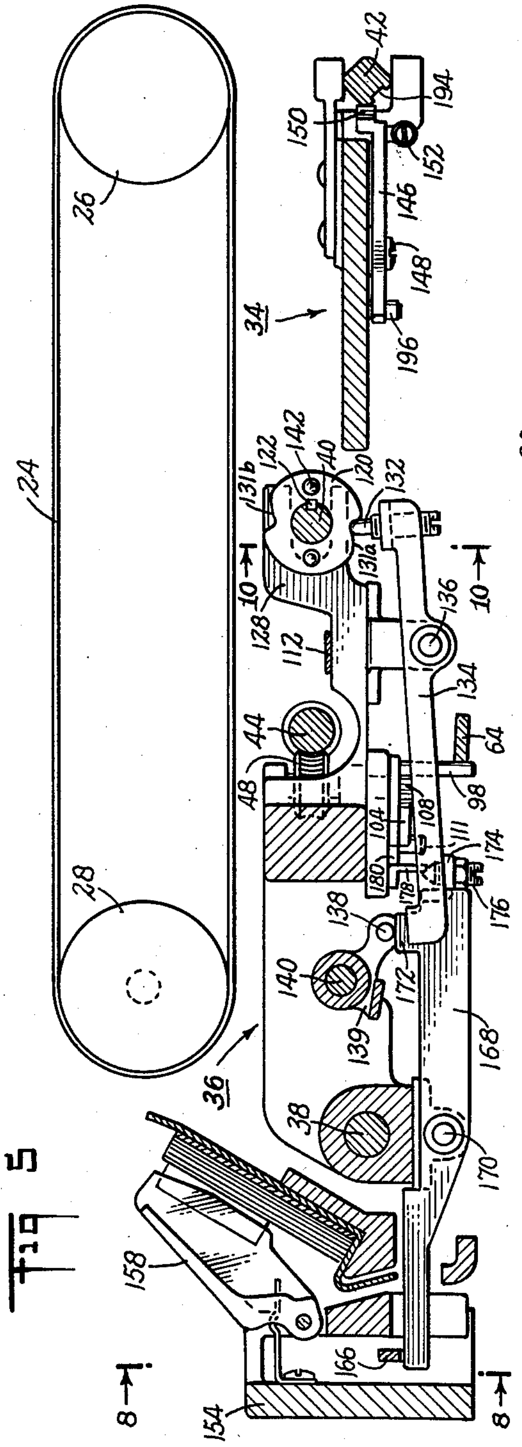
FIGURE 5 is an enlarged cross-section view taken along line 5—5 of FIGURE 2.

Referring now to FIGURE 5, a cam 120 is slidably mounted on center guide rod 40 but is arranged to rotate with this guide rod. For this purpose, cam 120 is fastened to the guide rod by means of a key 122 which is seated in a keyway 124 (FIGURE 9). Cam 120 also is formed with a sleeve 126 (FIGURE 10) about which is fitted a forked yoke 128 integral with the reproducing carriage 36. A collar 130 fastened to the end of the sleeve on the other side of this yoke assures that the reproducing carriage and the cam move together along the guide rod.

Seated in a notch 131*a* in cam 120 is a cam follower 132 (FIGURE 5) comprising a vertical pin threaded into one end of a lift lever 134. This lever is pivoted at 136 and the cam follower is urged towards the cam, as by the usual spring bias (not shown). When the cam rotates as described above, the cam follower is shifted down out of notch 131*a* and thereby rotates lever 134 clockwise about its pivot. The far end of this lever thereupon moves up to engage a rod 138 secured to an arm 139 which is pivoted at 140. This arm 139 (see FIGURE 6) is formed with an upstanding part carrying a pin 139*a* in contact with a yoke 52*a* on which the reproducing head 52 is mounted. Thus when arm 139 is rotated by lever 134, it in turn rotates head 52 counterclockwise about its pivot axis 141 (see also FIGURE 3), so that the head is shifted away from record 24 against the urging of a bias spring 53.

Accordingly, when the dictator presses the playback button 16, the feedscrew 44 will rotate in reverse to shift the reproducing carriage 36 to the rear, and at the same time cam 120 will rotate one-half revolution to move the reproducing head 52 out of engagement with the record 24 during the backspacing cycle. At the end of the backspacing cycle, cam follower 132 drops into the opposite notch 131*b* of the cam and the reproducing head is reengaged with the record.

If the dictator continues to hold the playback button 16 down, feedscrew 44 will start rotating at normal speed in forward direction at the end of the backspacing cycle, to advance the reproducing carriage 36 towards the recording carriage 34. During this latter phase, the reproducing head 52 is engaged with the record 24 and the dictated message will be played back through the microphone 12 which is arranged to operate as a loudspeaker for this purpose.

If the playback button 16 is released before the end of the backspacing cycle, the feedscrew 44 will stop when the cycle is complete, i.e. when cam follower 132 drops into the next notch 131*b*. Additional incremental backspacing steps may be obtained by repeatedly pressing and releasing the playback button and in this manner the reproducing carriage 36 may be shifted back to the desired portion of the dictated material. When this point has been reached, the reproducing carriage may be driven forward at normal speed towards the recording carriage merely by holding the playback button down continuously, and the selected dictation will thereby be played back.

When the playback operation has been completed in this manner, the sound record 24 very likely will not be in the same rotational position as it was when the backspacing operation was initiated. For that reason, if the recording head 50 were reengaged with the record while the recording carriage was in the position it occupied at the start of backspacing, the recording head stylus would be apt to contact a previously-recorded portion of the record. To avoid this, means also are provided to advance the recording carriage 34 a small distance forward each time a backspacing operation is initiated so that, when the recording head 50 subsequently is reengaged with the record, it always will contact a fresh unrecorded portion of this record.

For this purpose, as shown in FIGURES 9 and 10, the cam 120 is provided on one side with a pair of rounded buttons 142 protruding outwardly towards the recording carriage 34. These buttons are positioned diametrically opposite each other and, when the cam rotates, one of the buttons will engage a raised portion 144 on the recording carriage. Due to the slope of the engaging surfaces of parts 142, 144, the rotation of cam 120 produces a longitudinally-directed force against the recording carriage and pushes this carriage forward a short distance, e.g. a distance equal to the width of one groove on record 24.

As noted hereinabove, the reproducing carriage 36 is driven in reverse while cam 120 is rotating one-half revolution, and therefore the cam will have been moved away from the recording carriage by the time the backspacing cycle is complete. For that reason, any additional rotations of cam 120, in response to subsequent operation of the playback button 16, will have no effect on the position of the recording carriage 34 since neither of the buttons 142 can then engage the raised portion 144 of the recording carriage.

When the reproducing carriage 36 is moved backwards during a backspacing operation, the tension of negator spring 112 urges the recording carriage 34 in a reverse direction towards the reproducing carriage. To prevent reverse movement of the recording carriage, this carriage is provided (referring now to FIGURES 3, 5 and 9) with a stop arm 146 which serves as a "one-way" brake. This arm is pivoted at 148, and its pointed end 150 is urged by a bias spring 152 against a side edge of the back guide rod 42. Stop arm 146 is tipped forward at an angle with respect to the axis of the back guide rod so that when the recording carriage is moving in forward direction it develops essentially no restraining force on the carriage movement. However, when pressure is applied to the recording carriage to move it in reverse direction, stop arm 146 becomes wedged against the back guide rod and prevents such reverse movement. Consequently, when the reproducing carriage 36 is moved back during a backspacing operation, the recording carriage is held securely in its position of farthest advance.

After the sound record 24 has been completely filled with dictation, the record may be ejected by manually moving reproducing carriage 36 back to its starting point. For this purpose, the reproducing carriage carries a control arm 154 (FIGURES 1 to 3) which extends out through a slot 156 in the housing 10. This control arm also is provided with the usual indexing arrangement 158 cooperable with a marking pad 160 on the front panel of the dictating machine.

Figure 8:
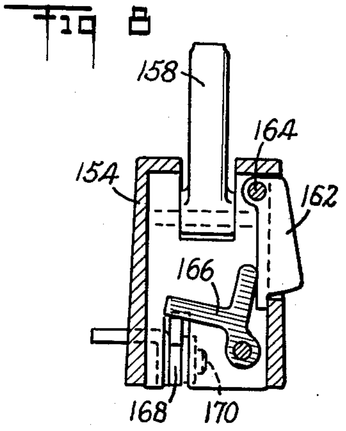
FIGURE 8 is a detail section taken along line 8—8 of FIGURE 5.

On one side of control arm 154 is a release button 162 which (referring now to FIGURE 8) is pivoted at 164. When this button is pressed, it rotates a link 166 to operate a lift lever 168. This lever (referring now to FIGURE 5) is pivoted at 170 and carries near its remote end a tab 172 adapted to move up against rod 138 when lever 168 is operated by button 162. Thus, as described above with reference to the other lift lever 134, the reproducing head 52 is rotated about its pivot mounting 141 to disengage its stylus from the sound record 24.

The release button 162 also operates a switch (not shown) to interrupt the energizing circuit for record solenoid 58 and thereby return bail 64 to its reproduce position. However, at the same time the reproducing carriage 36 is disengaged from the feedscrew 44 by operation of the release button 162. For this purpose, lift lever 168 is provided at its extreme right-hand end with an arm 174 carrying a vertical screw 176 having a conical tip the side of which is pressed against a tab 178 (see FIGURE 3) forming part of a link 180 pivoted at 182. This link is biased against the conical screw by means of a spring 184, and carries pin 111 in camming engagement with lock arm 104. When tab 178 is moved laterally by screw 176, the resultant clockwise movement of link 180 causes pin 111 to shift away from lock arm 104, thereby releasing this arm for rotary movement by its spring 110. Accordingly, the tooth 106 on lock arm 104 is shifted away from gear 108 so that the reproducing carriage 36 is disengaged from the feedscrew 44.

When the reproducing carriage has been moved back to its start position, a cam surface 188 on the front carriage bearing 190 engages a pin 192 secured to the front guide rod 38 and rotates this guide rod about 30°. This front guide rod is linked (as described hereinbelow) to an automatic record-ejection mechanism similar to that shown in the above-mentioned U.S. Patent 3,056,606, and which releases the record 24 from the mandrels 26, 28 and shifts the record laterally out through the insert opening 22 (FIGURE 1).

The front guide rod 38 also is linked (as described below) to the back guide rod 42 in such a manner that rotation of the front guide rod produces a corresponding clockwise rotation of the back guide rod to bring a slot 194 in the back guide rod into position opposite the pointed end 150 of stop arm 146. As shown in FIGURE 3, this stop arm 146 is engageable by a pin 196 to limit the counterclockwise motion of the arm and assure that, when slot 194 is opposite this arm, the pointed end 150 will be out of contact with the back guide rod 42. When this occurs, the recording carriage 34 is free to be pulled back, by negator spring 112, to its original start position abutting the reproducing carriage 36. When a fresh record has been placed on the mandrels 26, 28, the automatic record-ejection mechanism is released and both guide rods are returned to their original positions with the reproducing carriage 36 engaged with the feedscrew 44.

Figure 15:
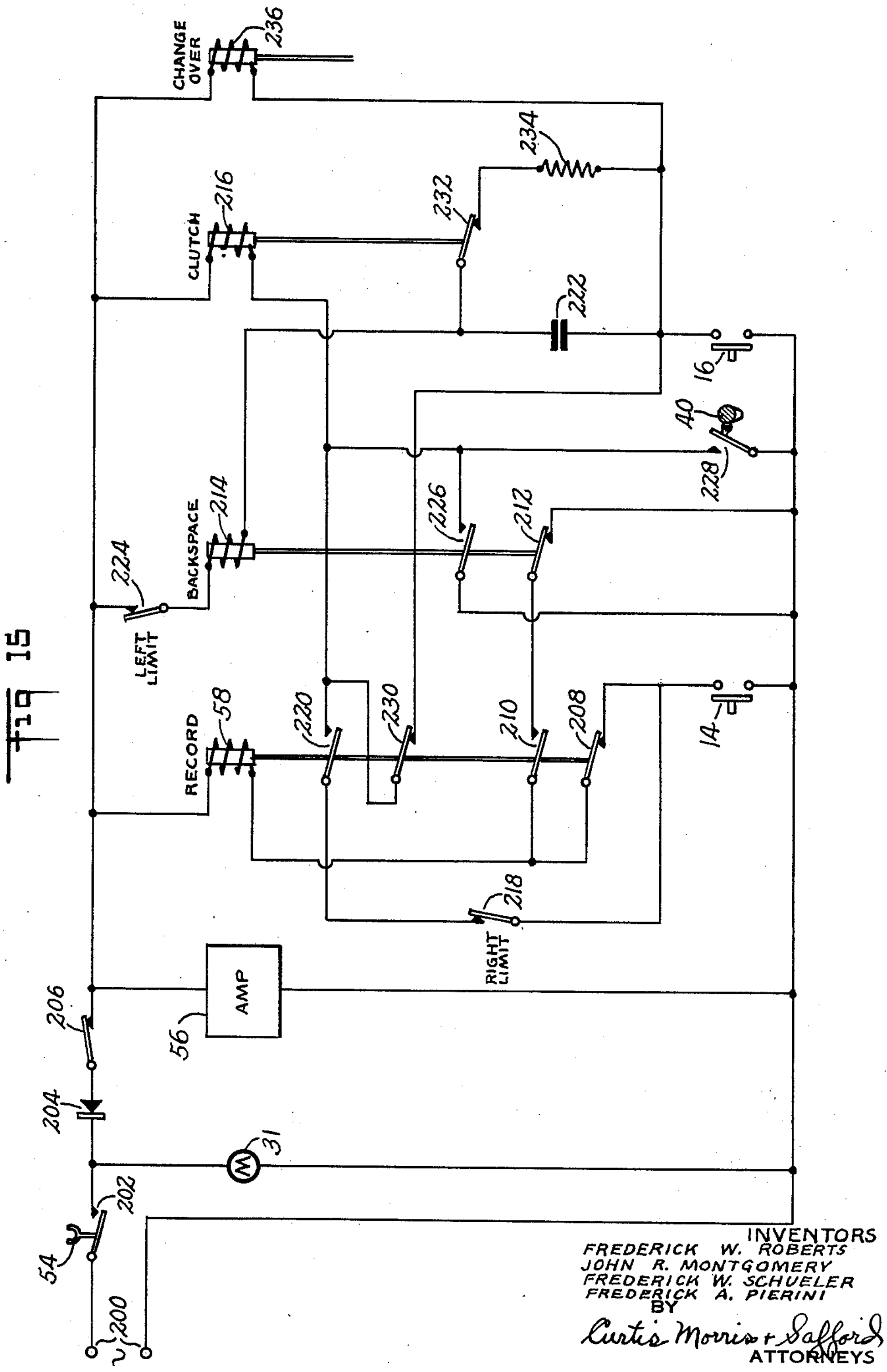
FIGURE 15 is a circuit diagram showing the principal electrical components of the basic dictating machine.

FIGURE 15 shows the principal operating elements of the electrical circuitry for controlling the various mechanisms referred to hereinabove. As shown in this circuit diagram, the dictating machine is provided with alternating current from the usual 115 volt, 60 cycle power mains 200. When the microphone is lifted from the cradle 54, it closes a hook switch 202 to feed alternating current to the motor 31 and, through a rectifier 204 and eject switch 206, to the transistor amplifier 56. The eject switch 206 is normally closed (as shown) and is operated to open position by rotation of the front guide rod 38 during the record eject cycle just described.

In the lower center region of FIGURE 15 is shown the record button 14 which, when actuated, connects power to the record solenoid 58 through contacts 208 operated by this solenoid. The solenoid thereupon is actuated, and closes switch contacts 210 to complete a hold-in circuit through contacts 212 of a backspace solenoid 214. Contacts 210 are arranged to close before contacts 208 open, in order to assure that there is no interruption in power to the record solenoid. After the hold-in circuit has been established, the record button 14 may be released without loss of power to the record solenoid.

With the record solenoid energized and the bail 64 in its recording position (as described hereinabove), any subsequent actuation of the record button 14 merely completes an energizing circuit to the clutch solenoid 216, the circuit passing through a right-limit-switch 218 and contacts 220 of the record solenoid. Energization of this clutch solenoid, as described in the above-mentioned U.S. Patent 3,056,606, causes both the record 24 and the feedscrew 44 to rotate so as to traverse the recording head 50 across the surface of the record. When the record button 14 is released, the clutch solenoid drops out to stop the record and the feedscrew, but the record solenoid 58 remains energized so that the dictating machine is maintained in its recording condition. The clutch solenoid also may be deenergized by operation of the right-limit-switch 218, which is opened by the recording carriage 34 when this carriage has been moved to the right-hand end of its travel, i.e. when the record has been completely filled with dictation.

To play back a portion of the dictated material, the playback button 16 is closed to charge up a capacitor 222 through a circuit including the backspace solenoid 214 and a left-limit-switch 224. The capacitor charging current momentarily energizes the solenoid, and its contacts 212 open to break the hold-in circuit for the record solenoid 58. When the record solenoid drops out, the bail 64 moves back to its normal reproducing position (as previously described) with the reproducing carriage 36 engaged with the feedscrew 44 for a backspacing operation. Actuation of the backspace solenoid causes the feedscrew 44 to drive the reproducing carriage 36 in reverse direction at four times its normal speed, and this reverse operation continues until the backspace solenoid is again deactuated. During the backspacing movement, motive power must of course be supplied to the feedscrew and for this purpose the clutch solenoid 216 is energized through contacts 226 of the backspace solenoid.

As soon as capacitor 222 has been fully charged, current no longer flows through the backspace solenoid 214. This occurs shortly after the backspacing operation has been initiated, but the backspace solenoid is maintained actuated by a mechanical detent means, as described in the above-mentioned U.S. Patent 2,961,243, until the backspace cycle has been completed (i.e. until center guide rod 40 has been rotated one-half revolution). To assure that current is maintained through the clutch solenoid winding until the end of the backspacing cycle, there is provided a timing switch 228 in parallel with contacts 226 of the backspace solenoid. This timing switch is operated by the center guide rod 40 (by conventional means not shown herein) and is so arranged that the switch contacts close immediately after the backspace solenoid has been actuated and open shortly after this solenoid has been deactuated.

After the backspace cycle has been completed, the backspace solenoid 214 drops out and the gear mechanism 30 is returned to its normal forward drive condition, as described in U.S. Patent 2,961,243. If the dictator continues to hold the playback button 16 down at this time, the energizing circuit for the clutch solenoid 216 is maintained through contacts 230 of the record solenoid 58, and the feedscrew 44 thereupon rotates at normal speed in forward direction to drive the reproducing carriage 36 back towards the recording carriage 34 to play back the dictated material from the record. On the other hand, if the playback button 16 is released before the end of the backspacing cycle, the clutch solenoid 216 will be deenergized at the end of the cycle and its contacts 232 will close to discharge the capacitor 222 through a resistor 234. The capacitor circuit thereby is conditioned for another backspacing operation upon the subsequent closure of playback button 16, so that the reproducing carriage 36 may be backed up in incremental steps as far as desired. If the reproducing carriage is moved back all the way to its starting position, the left-limit-switch 224 is opened by the reproducing carriage (by conventional means not shown herein) to break the energizing circuit to the backspace solenoid and prevent any further backspacing movement.

Actuation of the playback button 16 also completes an energizing circuit to a changeover solenoid 236 which operates in the usual way to switch the amplifier circuitry from recording condition to reproducing condition, so that the sound signals picked up from the record 24 are amplified before being transmitted to the microphone 12. Whenever the playback button is released, this changeover solenoid is deenergized to return the amplifier circuitry to its recording condition.

If the playback button 16 is held down continuously, the reproducing carriage 36 will be driven forward steadily and ultimately will strike the recording carriage 34. If at this point the dictator still holds the playback button down, the reproducing carriage will push the recording carriage ahead over the unrecorded portion of the record. However, the completion of the playback operation will immediately be apparent to the dictator since no more voice signals will be heard from the microphone 12, and the dictator normally will then switch the machine back to recording condition to resume his dictation.

If desired, the apparatus can be provided with means automatically operable to switch the machine from playback to recording condition when the reproducing carriage 36 reaches the record carriage 34. Such an arrangement is diagrammatically indicated in FIGURE 9 wherein a switch 237 is shown (in light outline) secured to the recording carriage to be operated by a corresponding extension 237*a* of the reproducing carriage. In a conventional manner, this switch can be arranged to reenergize the record solenoid 58 when the reproducing carriage reaches the position of the recording carriage, and thereby automatically place the machine in condition for a recording operation.

If, during a playback operation, the dictator desires to resume dictation before the reproducing carriage 36 has been driven back to the recording carriage 34, he may do so immediately merely by releasing the playback button 16 and pressing the record button 14. When this is done, the changeover solenoid 236 is deenergized to switch the machine to recording condition, and the record solenoid 58 is reenergized as described above to start the recording carriage 34 moving forward with the recording head 50 engaged with the record. Energization of the record solenoid 58 also disengages the reproducing feednut 48 from the feedscrew 44, and the reproducing carriage therefore is brought rapidly back up to its normal position, i.e. abutting the recording carriage 34, by the tension of the negator spring 112. Conventional shock absorbing means (not shown), such as a dashpot or the like, may be placed between the two carriages to cushion the impact if desired.

For certain applications, it may be advantageous to provide a power-operated drive for shifting both carriages back to their start positions after the record has been completely filled with dictation. Such an arrangement is shown in the modified construction outlined in FIGURES 11–14, which show portions of the basic dictating machine structure described hereinabove with certain additional features now to be described. (Note: The parts of this modified construction that are identical to corresponding parts of the basic machine are identified herein by the same reference numbers.)

Figure 11:
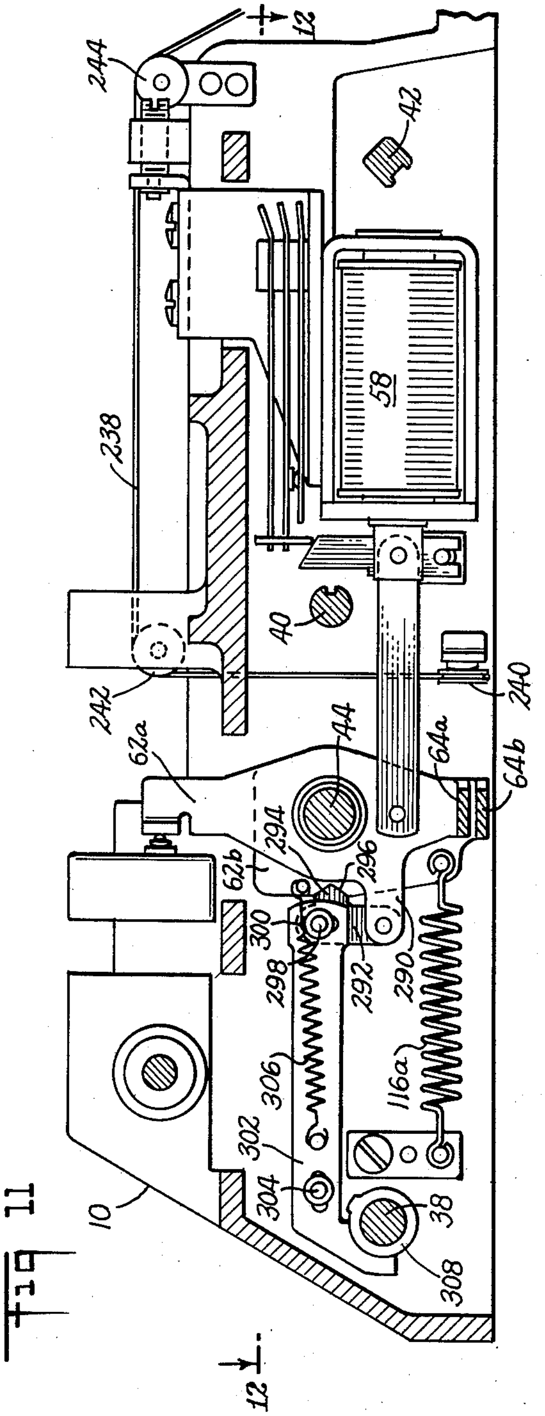
FIGURE 11 is a cross-section view similar to FIGURE 4, but showing a modified bail construction.
Figure 12:
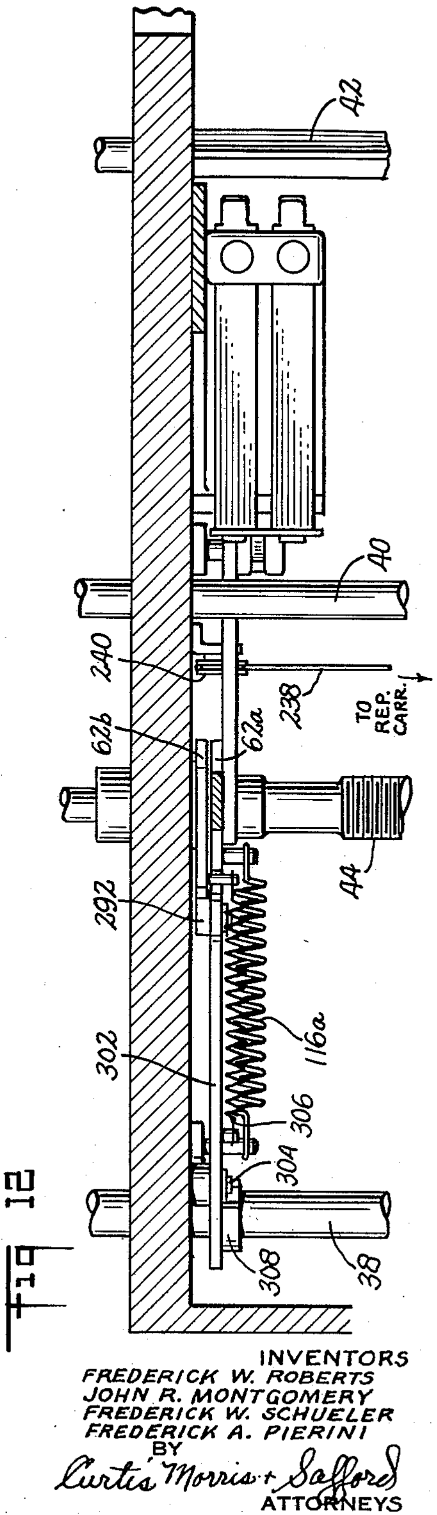
FIGURE 12 is a horizontal section taken along line 12—12 of FIGURE 11.
Figure 13:
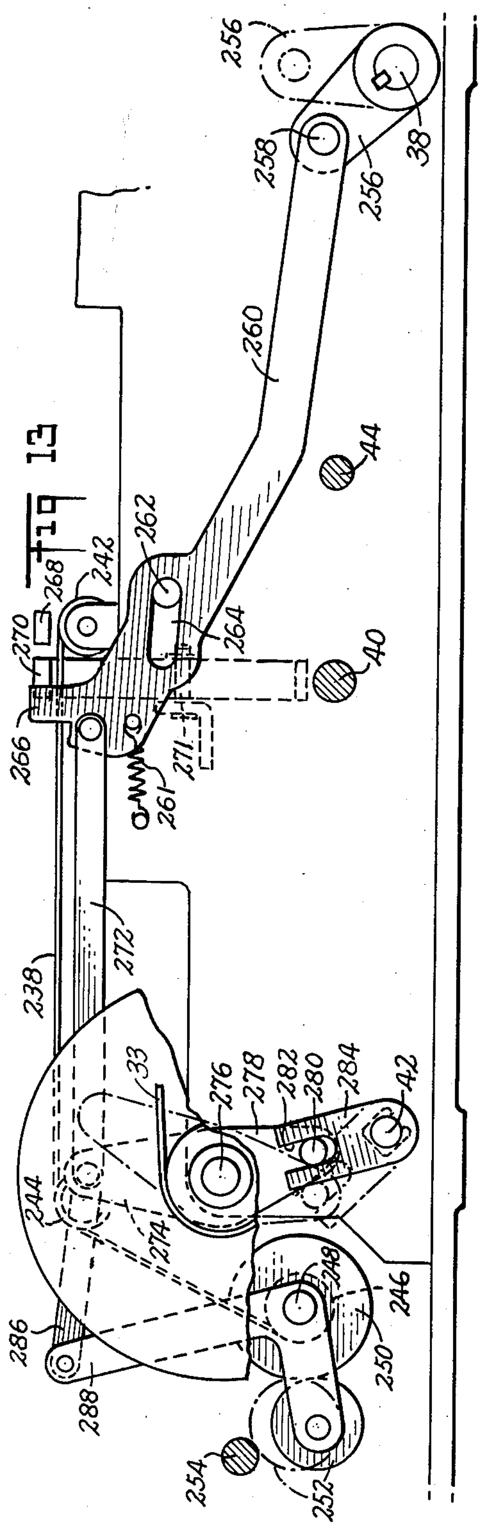
FIGURE 13 is an enlarged vertical section showing a modified arrangement for retracting the reproducing carriage.
Figure 14:
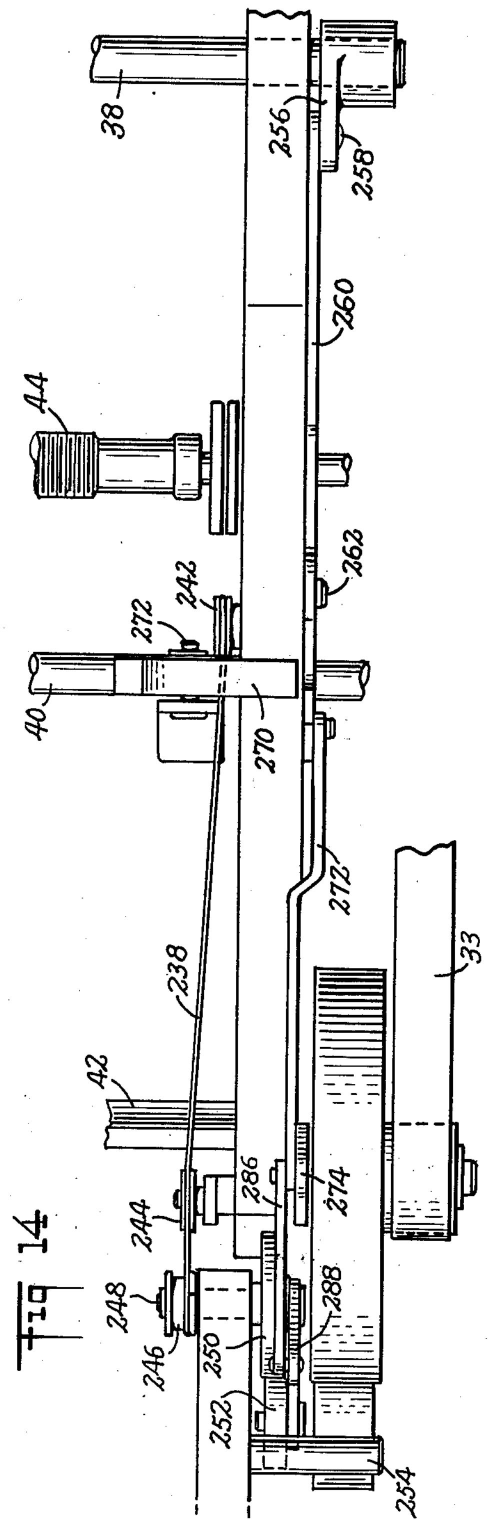
FIGURE 14 is a top plan view showing further details of the structure outlined in FIGURE 13.

Referring first to FIGURES 11 and 12, there is shown a carriage pull-back cord 238 one end of which is connected to the reproducing carriage 36. This cord extends from the reproducing carriage around three pulleys 240, 242, 244 and (referring now to FIGURES 13 and 14) is fastened to a wind-up windless 246 mounted on a shaft 248. This shaft also carries a drive drum 250 which is adapted to be rotated by a puck 252 when the puck is pressed against the shaft 254 of the dictating machine motor. When the drum is rotated in this manner, the windlass 246 will draw the cord 238 in and pull the reproducing carriage 36 back to its starting position.

This automatic drive for the reproducing carriage is initiated by rotating the front guide rod 38 about 30°, as by means of a manually-operable lever (not shown herein, but similar to that identified with reference number 50 in the above mentioned U.S. Patent 3,056,606 wherein the lever is connected directly to the front guide rod and extends out through the front panel of the dictating machine). Front guide rod 38 carries an arm 256 which is pivotally pinned at 258 to an eject lever 260. When rod 38 is rotated, this eject lever moves laterally towards the front of the machine, and is guided in this movement by a stud 262 extending through a horizontal slot 264 in the lever.

The top of the eject lever 260 is formed with an upstanding ear 266 adapted to engage the usual release hook 268 (corresponding to the part identified with reference number 182 in the above-mentioned U.S. Patent 3,056,606). As described in that patent, when the release hook is shifted forward by the eject lever 260, the record on the mandrels 26, 28 is automatically ejected through the insert opening of the dictating machine. At the same time, a vertical Z-bar 270 is shifted into position abutting the eject lever to hold it in eject position until the carriages have been returned to their start position.

Pivotally secured to the upper part of the eject lever 260 is a horizontal arm 272 which is operable to rotate a vertical arm 274 about its pivot axis 276. The lower extension 278 of arm 174 carries a pin 280 fitted in a radial slot 282 formed in a link 284 which, at its lower end, is secured to the back guide rod 42. When the vertical arm 274 is rotated clockwise by the forward motion of the eject lever 260, this back guide rod 42 will correspondingly rotate to release the recording carriage from its stop arm 146 (FIGURE 3) so that the recording carriage may be shifted in reverse direction.

Also pinned to the top of vertical arm 274 is a rearwardly extending link 286 which operates a bell crank 288 rotatably mounted on the windlass shaft 248. This bell crank carries the puck 252, and shifts this puck up into engagement with the motor shaft 254 when the eject lever 260 is moved forward by rotation of the front guide rod 38. Therefore, when the record is ejected from the dictating machine, the windlass 246 is rotated by the puck to draw in the cord 238 and pull the reproducing carriage 36 back to its start position.

In this modified construction, the power-driven pullback mechanism is arranged to move both the reproducing and recording carriages back at the same time. This requires that both carriages be disengaged from the feedscrew 44 concurrently, and the modified construction includes a double-bail arrangement 64*a*, 64*b* (FIGURE 11) for accomplishing this.

During normal operation of the dictating machine, these two bails 64*a*, 64*b* are locked together and provide the identical control action obtained by the single bail 64 described above. In more detail, the inner bail arm 62*a* is formed with an extension 290 to which is pivotally pinned a vertical element 292 having an arrow-shaped finger 294 seated in a mating cut-out 296 on the outer bail arm 62*b*. Secured to the vertical element 292 is a pin 298 which extends through a curved slot 300 in a horizontal lever 302. This lever is supported by a stud 304 for longitudinal movement, and is urged to the right by a spring 306 fastened to the outer bail arm 62*b*. Thus, the pressure of spring 306 normally maintains the finger 294 engaged with the outer bail arm, so that bails 64*a*, 64*b* operate, in effect, as a single bail.

When the record solenoid 58 is energized, it pulls both bails 64*a*, 64*b* to the right, just as in the basic machine. The outer bail 64*b* shifts the recording lock link 68 (FIGURE 3) to the position where the recording feednut 46 is engaged with the feedscrew 44, and also shifts the retractor lever 84 to its recording position. The inner bail 64*a* shifts the reproducing lock link 100 to the position where the reproducing feednut 48 is disengaged from the feedscrew. Thus the record carriage 34 and the reproducing carriage 36 are driven forward by the feedscrew for a recording operation.

The backspacing operation of this modified machine also is identical to that of the basic machine. For that purpose, the record solenoid 58 is deenergized to move both bails 64*a*, 64*b* back to the left under the urging of the bail spring 116*a*, thereby disengaging the recording carriage 34 from the feedscrew 44, shifting the recording head 50 away from the record 24, and engaging the reproducing carriage 36 with the feedscrew. Thus the reproducing carriage may be driven to the rear by reverse rotation of the feedscrew, and subsequent forward rotation of the feedscrew will move the reproducing carriage forward to play back the dictated material.

When it is desired to move both carriages back to their start positions as by means of the windlass arrangement 246 described hereinabove, the front guide rod 38 is rotated to activate the windlass 246 as previously described. As shown in FIGURE 11, this front guide rod carries a cam 308 which rotates with the guide rod to operate the horizontal lever 302 when the guide rod is rotated. This lever thus is moved to the left against its bias spring 306, and the lever carries with it the pin 298 which pulls the pointed finger 294 out of the outer bail arm 62*b*. This effectively disconnects the inner bail 64*a* from the inner bail 64*b*, so that these two bails are free to move independently.

With the record solenoid 58 energized, the inner bail 64*a* will be maintained in its right-hand position wherein the reproducing lock link 100 (FIGURE 3) controlled by this bail will be in position to disengage the reproducing feednut 48 from the feedscrew 44. Concurrently, the outer bail 64*b* will be pulled to the left by the bail spring 116*a* so that the recording lock link 68 controlled by this outer bail will be positioned to disengage the recording feednut 46 from the feedscrew. Also, the retractor lever 84 will be moved to disengage the recording head 50 from the sound record 24. Accordingly, the recording and reproducing carriages and the recording head all will be disengaged and free to be moved in reverse by the flexible cord 238 as it is wound up on the windlass 246. Although the cord is connected only to the reproducing carriage 36, the recording carriage 34 will be drawn back along with the reproducing carriage because the two carriages are connected together by the negator spring 112.

When the reproducing carriage 36 reaches its start position, the collar 130 (FIGURE 9) of the carriage strikes the lower end of Z-bar 270 which thus is rotated about its pivot 271 so that its upper end is moved back out of the path of the eject lever 260. This lever thereupon moves to the left (FIGURE 13) under the urging of its spring 261 to disengage the puck 252 from the motor drive shaft 254 and returns the back guide rod 42 to its normal position with one edge in contact with the stop arm 146. Similarly, the return of the front guide rod 38 to its normal position permits the horizontal lever 302 to move the pointed finger 294 into the mating cutout 296 in outer bail arm 62*b*. Accordingly, the two bails 64*a*, 64*b* will again be integrally secured together and will operate in unison during the normal dictating and playback operations of the machine.

Although specific embodiments of the invention have been set forth in detail, it is desired to emphasize that these are not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. Dictation apparatus comprising a first movable device having a recording head adapted to cooperate with a sound record to impress sound signals thereon; a second movable device having a reproducing head adapted to cooperate with said record to produce an output corresponding to sound signals impressed thereon; and power-operated backspacing means for shifting said second movable device in reverse direction while maintaining said first movable device in a forward position.

2. Apparatus as claimed in claim 1, including power drive means for rapidly returning said second movable device back to its normal forward position after a playback operation has been completed.

3. Apparatus as claimed in claim 2, wherein said power drive means comprises spring means secured to said second movable device.

4. Apparatus as claimed in claim 3, wherein said spring means comprises a negator spring connected between said first and second movable devices, said negator spring providing a substantially constant restraining force for all positions of said second movable device relative to said first movable device.

5. Dictation apparatus comprising a recording carriage having a recording head adapted to cooperate with a sound record to impress sound signals thereon; a reproducing carriage having a reproducing head adapted to cooperate with said record to produce an output corresponding to sound signals impressed thereon; drive means including a feedscrew for moving both of said carriages; first and second feednuts for said carriages respectively; control means having recording and backspacing positions, said control means being operative in said recording position to engage said first feednut and to disengage said second feednut, said control means being operative in said backspacing position to engage said second feednut and disengage said first feednut.

6. Apparatus as claimed in claim 5, including manually-operable means secured to said reproducing carriage for shifting said reproducing carriage in reverse direction, said manually-operable means including a mechanism operable to disengage said second feednut from said feedscrew.

7. Apparatus as claimed in claim 6, wherein said mechanism operates to lift said reproducing head from said record while said reproducing carriage is being shifted in reverse direction.

8. Apparatus as claimed in claim 6, said manually-operable means comprising a control arm extending out in front of said dictation apparatus and having a control button arranged when pressed to actuate said mechanism.

9. Dictation apparatus comprising a recording carriage having a recording head adapted to cooperate with a sound record to impress sound signals thereon; a reproducing carriage having a reproducing head adapted to cooperate with said record to produce an output corresponding to sound signals impressed thereon; drive means for moving both said carriages together in a forward direction during a recording operation; backspacing means for shifting said reproducing carriage in reverse direction; and stop means operable to prevent said recording carriage from moving in reverse direction during a backspacing operation.

10. Apparatus as claimed in claim 9, wherein said dictation apparatus includes a frame structure, said stop means comprising a member movable with said recording carriage and adapted to be wedged against a portion of said frame structure.

11. Apparatus as claimed in claim 10, wherein said frame structure includes a plurality of guide rods on which said carriages are mounted for sliding movement; said stop means member being engageable with one of said guide rods.

12. Apparatus as claimed in claim 10, wherein said frame structure portion is shiftable to a position out of engagement with said stop means member to permit said recording carriage to be moved in reverse direction.

13. Apparatus as claimed in claim 12, wherein said frame structure portion comprises a guide rod on which said recording carriage is mounted for movement, said guide rod being rotatable to a position disengaging said stop means member from said guide rod.

14. Apparatus as claimed in claim 13, wherein said guide rod is formed with a protruding longitudinal edge, said stop means member consisting of an elongated rigid part positioned at an acute angle with respect to said rod and with one end thereof in contact with said protruding edge, spring means urging said rigid part into engagement with said rod, said rod being rotatable to shift its protruding edge out of engagement with said part, and means to prevent said part from moving into contact with said rod when said rod edge has been rotated away from said part.

15. Dictation apparatus comprising a recording carriage having a recording head adapted to cooperate with a sound record to impress sound signals thereon; a reproducing carriage having a reproducing head adapted to cooperate with said record to produce an output corresponding to sound signals impressed thereon; drive means for moving both said carriages together in a forward direction during a recording operation; backspacing means for shifting said reproducing carriage in reverse direction; and carriage-shifting means operable to advance said recording carriage a small distance when said reproducing carriage is backspaced.

16. Apparatus as claimed in claim 15, wherein said carriage-shifting means includes a wedge member that is movable laterally with respect to the direction of carriage movement to engage a part carried by said recording carriage, said wedge-member having an engagement surface that is formed at an acute angle with respect to the direction of movement of said recording carriage.

17. Apparatus as claimed in claim 15, wherein said carriage-shifting means comprises an element carried along with said reproducing carriage and movable into engagement with said recording carriage during the initial portion of a backspacing cycle.

18. Apparatus as claimed in claim 17, wherein said reproducing carriage is mounted on a rotatable guide rod, said element being movable by rotation of said guide rod to engage said recording carriage and move it forward a small distance.

19. Apparatus as claimed in claim 18, wherein said element comprises a disc slidably mounted on said guide rod and keyed thereto for rotation with said guide rod; said disc being formed on one side face thereof with a protruding button-like portion that engages said recording carriage when the disc is rotated by the guide rod.

20. Dictation apparatus comprising first, second and third carriage guide rods; a recording carriage slidably mounted on said first and second guide rods and having a recording head adapted to cooperate with a sound record to impress sound signals thereon; a reproducing carriage slidably mounted on said second and third guide rods and having a reproducing head adapted to cooperate with said record to produce an output corresponding to sound signals impressed thereon; and backspacing means for shifting said reproducing carriage in reverse direction while maintaining said recording carriage in a forward position, whereby after the backspacing operation is complete said recording head is operable immediately to continue the recording operation.

21. Apparatus as claimed in claim 20, wherein said reproducing carriage includes a portion positioned to the rear of said recording carriage; and spring means securing said reproducing carriage portion to said recording carriage.

22. Apparatus as claimed in claim 20, wherein one of said guide rods is mounted for rotary movement during a backspacing operation; cam means carried by said one guide rod, a cam follower engageable with said cam means; and lever means operable by said cam follower to shift said reproducing head away from said record during a backspacing operation.

23. Dictation apparatus comprising a recording carriage having a recording head adapted to cooperate with a sound record to impress sound signals thereon; a reproducing carriage having a reproducing head adapted to cooperate with said record to produce an output corresponding to sound signals impressed thereon; a feedscrew for driving said carriages, a first feednut for said recording carriage, a second feednut for said reproducing carriage; bail means mounted parallel to said feedscrew and movable into recording and reproducing positions; feednut locking means operable by said bail means to selectively engage either said first or second feednut with said feedscrew; and backspacing means for shifting said reproducing carriage in reverse direction while maintaining said recording carriage in a forward position, whereby after the backspacing operation is complete said recording head is positioned to continue the recording operation.

24. Apparatus as claimed in claim 23, wherein said feednut locking means comprises first and second rotary members mounted coaxially with said first and second feednuts respectively; and first and second link means positioned on opposite sides of said bail means and selectively operable thereby to lock one or the other of said rotary members against rotation in accordance with the positioning of said bail means.

25. Apparatus as claimed in claim 23, including lift means operable by said bail means to shift said recording head away from said record during a backspacing operation.

26. Apparatus as claimed in claim 25, including second lift means operable by said backspacing means to shift said reproducing head away from said record during a backspacing operation.

27. Dictation apparatus comprising support means for holding a sound record; a recording carriage having a recording head adapted to cooperate with said record to impress sound signals thereon; a reproducing carriage having a reproducing head adapted to cooperate with said record to produce an output corresponding to sound signals impressed thereon; backspacing means for shifting said reproducing carriage in reverse direction while maintaining said recording carriage in a forward position, whereby after the backspacing operation is complete said recording head is positioned to continue the recording operation; an eject mechanism for shifting said record from its normal position on said support means; and control means operable by said reproducing carriage when it has been shifted back to its starting position, said control means being effective to activate said eject mechanism.

28. Apparatus as claimed in claim 27, wherein said reproducing carriage is slidably mounted on a rotatable guide rod; said control means including an element integral with said guide rod and engageable by said reproducing carriage to rotate said guide rod for activating said eject mechanism.

29. Dictation apparatus comprising a recording carriage having a recording head adapted to cooperate with a sound record to impress sound signals thereon; a reproducing carriage having a reproducing head adapted to cooperate with said record to produce an output corresponding to sound signals impressed thereon; backspacing means for shifting said reproducing carriage in reverse direction while maintaining said recording carriage in a forward position; whereby after the backspacing operation is complete said recording head is positioned to continue the recording operation; and power-operated drive means for moving said reproducing carriage in reverse direction back to its initial starting position.

30. Apparatus as claimed in claim 29, wherein said drive means includes a motor-driven windlass, and a flexible cord secured to said windlass to be wrapped therearound when said windlass is rotated, said cord being fastened to said reproducing carriage and arranged to pull said carriage in reverse direction.

31. Apparatus as claimed in claim 29, wherein said drive means is arranged to move both of said carriages in unison.

32. Apparatus as claimed in claim 31, including a feedscrew for driving said carriages; first and second locking means for engaging said recording and reproducing carriages respectively to said feedscrew; and first and second bail means operable independently to actuate said first and second locking means respectively.

33. Apparatus as claimed in claim 32, including shiftable keying means normally positioned to secure said first and second bail means together, whereby said bail means are operable to selectively actuate either said first or said second locking means; means operable to shift said keying means to release said first and second bail means for independent movement; and control means operated by said drive means to move said first and second bail means to positions releasing said first and second locking means, whereby both of said carriages are disengaged from said feedscrew.

34. Dictation apparatus comprising a recording carriage having a recording head adapted to cooperate with a sound record to impress sound signals thereon; a reproducing carriage having a reproducing head adapted to cooperate with said record to produce an output corresponding to sound signals impressed thereon; means interconnecting said carriages; manually-operable means for shifting said reproducing carriage in reverse direction back to its start position; engagement means for maintaining said recording carriage in a forward position during said reverse movement of said reproducing carriage; and release means automatically operable by said reproducing carriage when in its start position, said release means including means to operate said engagement means and free said recording carriage for reverse movement back to its start position.

35. Apparatus as claimed in claim 34, including a feedscrew for driving said recording carriage; said engagement means comprising a feednut carried by said recording carriage and operable by said feedscrew.

36. Apparatus as claimed in claim 34, wherein said engagement means comprises a one-way stop device normally operable to permit forward movement of said recording carriage and to prevent reverse movement of said recording carriage.

37. Apparatus as claimed in claim 34, wherein said interconnecting means comprises a resilient spring arranged to pull said recording carriage back to its start position upon operation of said release means.

38. Dictation apparatus comprising movable means; transducing head means mounted on said movable means and adapted to cooperate with a sound record; power-operated backspacing means for shifting said movable means in reverse direction from a forward position back to a rearward position for playing back a part of the dictated material on said record; first power-operated drive means for advancing said movable means at normal speed to permit playing back the dictated material on said record; and second power-operated drive means for advancing said movable means at high speed up to its forward position of previous farthest advance.

39. Apparatus as claimed in claim 38, wherein said power-operated drive means comprises spring means connected to said movable means.

40. Dictation apparatus comprising means for recording and reproducing sound on a record and including first and second movable devices having, respectively, a recording head and a reproducing head adapted to cooperate with the sound record, drive means for advancing both of said movable devices together in a forward direction during a recording operation, thereby to maintain said reproducing head in step with and adjacent said recording head; remotely-controllable power-operated backspacing means for shifting said second movable device with its reproducing head in reverse direction for a playback operation while maintaining said first movable device with its recording head in a forward position; and fast-acting power-operated return means for automatically shifting said second movable device back to its normal forward position adjacent said first movable device after the playback operation has been completed.

41. Dictation apparatus comprising movable means; transducing head means mounted on said movable means and adapted to cooperate with a sound record; power-operated backspacing means for shifting said movable means in reverse direction from a forward position back to a rearward position for playing back a part of the dictated material on said record; a device shiftable in forward direction with said movable means during a recording operation; holding means for maintaining said device in its position of farthest advance while said movable means is backspaced for playback operation; and power-operated drive means comprising spring means connected between said movable means and said device for advancing said movable means up to its forward position of previous farthest advance.

42. Dictation apparatus comprising first and second movable means; recording head means on said first movable means to cooperate with a sound record; reproducing head means on said second movable means to cooperate with said sound record; means supporting said first and second movable means for traveling movement along a path adjacent said sound record; recording drive means effective to produce a forward traveling movement of said two movable means simultaneously and at the same speed so that during a recording operation said reproducing head means is maintained in a predetermined position closely adjacent said recording head means; backspacing means operable to shift said second movable means in reverse direction along said path to bring said reproducing head means back to a previously recorded portion of the record which it is desired to listen to; means effective during this backspacing movement to maintain said first movable means in a forward position with said recording head means thereby positioned for immediate resumption of recording; reproduce drive means operable after a backspacing operation to shift said second movable means in a forward direction while said first movable means is maintained in said forward position, thereby to permit said reproducing head means to play back the desired portion of said record; and power-operated return means for automatically shifting said second movable means in a forward direction along said path and up to said predetermined position relative to said first movable means while said first movable means is conditioned to be driven forward to resume recording, said return means being operable to shift said second movable means at a speed substantially higher than the speed effected by said reproduce drive means during the play back operation.

43. Dictation apparatus comprising a revolvable sound record, carriage means mounted for traveling movement with respect to said record and carrying recording and reproducing head means adapted to record and play back sound signals on said record, drive means for producing traveling movement of said carriage means in either forward or reverse direction; operating means shiftable alternatively into recording or reproducing condition, said operating means including means operatively associated with said drive means for causing said recording head means to be driven forward when said operating means is in recording condition and for causing said reproducing head means to be driven in reverse direction when said operating means is in reproducing condition; power means operable when actuated to energize said drive means; a recording switch means and a reproducing switch means remote from said dictation apparatus and operable manually as desired to effect recording or play back functions; first circuit means connecting said recording switch means to said dictation apparatus, first control means operable by said first circuit means in response to actuation of said recording switch means and arranged when operated to shift said operating means into recording condition and simultaneously to actuate said power means to cause said recording head means to be driven in forward direction to permit dictation to be placed on said record; hold-in means operatively connected to said first control means for maintaining said operating means in recording condition after said recording switch means is released, whereby said recording switch means thereafter serves to turn said power means on and off while said apparatus remains in recording condition; second circuit means connecting said reproducing switch means to said dictation apparatus, second control means operable by said second circuit means, said second control means being operatively associated with said hold-in means for deactivating said hold-in means when said reproducing switch means is actuated, and means connected to said operating means for shifting said operating means to reproducing condition when said hold-in means is deactivated, thereby to accommodate the backspacing movement of said reproducing head means for the purpose of playing back previously recorded material on said record.

44. Apparatus as claimed in claim 43, wherein said power means includes an electrical motor, said power means further including a clutch which is energized when either said recording switch means or said reproducing switch means is actuated, thereby to apply power to said drive means for the purpose of driving said recording head means or said reproducing head means forward or in reverse direction respectively.

References Cited in the file of this patent

UNITED STATES PATENTS

| | | |
|---|---|---|
| 1,842,550 | Holland | Jan. 26, 1932 |
| 2,127,593 | Grahann | Aug. 23, 1938 |
| 2,284,836 | Norton et al. | June 2, 1942 |
| 2,371,116 | Yerkovitch et al. | Mar. 6, 1945 |
| 2,613,938 | Bossmeyer | Oct. 14, 1952 |
| 2,900,191 | Roberts | Aug. 18, 1959 |